United States Patent
Herve

(10) Patent No.: US 8,444,886 B2
(45) Date of Patent: *May 21, 2013

(54) PREPARATION OF THERMOPLASTIC POLYMER PARTICLES HAVING CONTROLLED GEOMETRY AND POWDERS OBTAINED THEREFROM

(75) Inventor: Pascal Herve, Lyons (FR)

(73) Assignee: Rhodia Operations, Aubervilliers (FR)

( * ) Notice: Subject to any disclaimer, the term of this patent is extended or adjusted under 35 U.S.C. 154(b) by 630 days.

This patent is subject to a terminal disclaimer.

(21) Appl. No.: 12/226,226

(22) PCT Filed: Apr. 3, 2007

(86) PCT No.: PCT/EP2007/053251
§ 371 (c)(1),
(2), (4) Date: Apr. 21, 2009

(87) PCT Pub. No.: WO2007/115977
PCT Pub. Date: Oct. 18, 2007

(65) Prior Publication Data
US 2010/0009189 A1    Jan. 14, 2010

(30) Foreign Application Priority Data
Apr. 10, 2006    (FR) ..................................... 06 03142

(51) Int. Cl.
*B29B 9/00*    (2006.01)
*B28B 3/20*    (2006.01)
*B29C 47/00*    (2006.01)
*B32B 5/16*    (2006.01)

(52) U.S. Cl.
USPC ............ 264/9; 264/5; 264/7; 264/13; 264/14; 264/176.1; 264/178 R; 264/180; 428/402; 428/403; 428/407

(58) Field of Classification Search
USPC .................. 264/5, 9, 13, 14, 7, 176.1, 178 R, 264/180; 428/402, 403, 407
See application file for complete search history.

(56) References Cited

U.S. PATENT DOCUMENTS

| | | | | |
|---|---|---|---|---|
| 3,446,782 | A | * | 5/1969 | Nakasatomi et al. ......... 528/323 |
| 3,449,291 | A | * | 6/1969 | Bartsch et al. ............... 524/562 |
| 3,586,654 | A | * | 6/1971 | Bartsch et al. ........... 430/137.18 |
| 3,674,736 | A | * | 7/1972 | Lerman et al. ............... 523/307 |
| 4,104,453 | A | * | 8/1978 | Broering et al. ................ 525/62 |

(Continued)

FOREIGN PATENT DOCUMENTS

| | | | |
|---|---|---|---|
| JP | 2001114901 A | * | 4/2001 |
| WO | WO 94/06059 | | 3/1994 |
| WO | WO 9406059 A1 | * | 3/1994 |
| WO | WO 00/68298 | | 11/2000 |

(Continued)

OTHER PUBLICATIONS

International Search Report PCT/EP2007/053251 dated May 16, 2007.

*Primary Examiner* — Christina Johnson
*Assistant Examiner* — Atul P. Khare
(74) *Attorney, Agent, or Firm* — Dentons US LLP

(57) ABSTRACT

Controlled geometry particles of thermoplastic polymers are prepared from compositions containing the thermoplastic polymer and two additives, in the molten state, by cooling the molten composition and disintegrating the resulting dispersion of thermoplastic polymer; powders obtained therefrom advantageously have mean particle diameters ranging from 0.1 to 800 μm and are useful additives in, e.g., paints and coatings.

26 Claims, 1 Drawing Sheet

U.S. PATENT DOCUMENTS

| | | | |
|---|---|---|---|
| 4,252,969 A * | 2/1981 | Broering et al. | 528/492 |
| 4,254,207 A * | 3/1981 | Landoll et al. | 430/137.19 |
| 4,329,304 A * | 5/1982 | McClain | 264/8 |
| 6,872,800 B1 * | 3/2005 | Bouquerel et al. | 528/310 |
| 2004/0242788 A1 * | 12/2004 | La Grande et al. | 525/242 |
| 2005/0222376 A1 * | 10/2005 | Sassi et al. | 528/310 |
| 2009/0072424 A1 * | 3/2009 | Herve et al. | 264/14 |

FOREIGN PATENT DOCUMENTS

| | | |
|---|---|---|
| WO | WO 03/002668 A1 | 1/2003 |
| WO | WO 03002668 A1 * | 1/2003 |
| WO | WO 03051993 A1 * | 6/2003 |
| WO | WO 2006/040443 A1 | 4/2006 |
| WO | WO 2006040443 A1 * | 4/2006 |

* cited by examiner

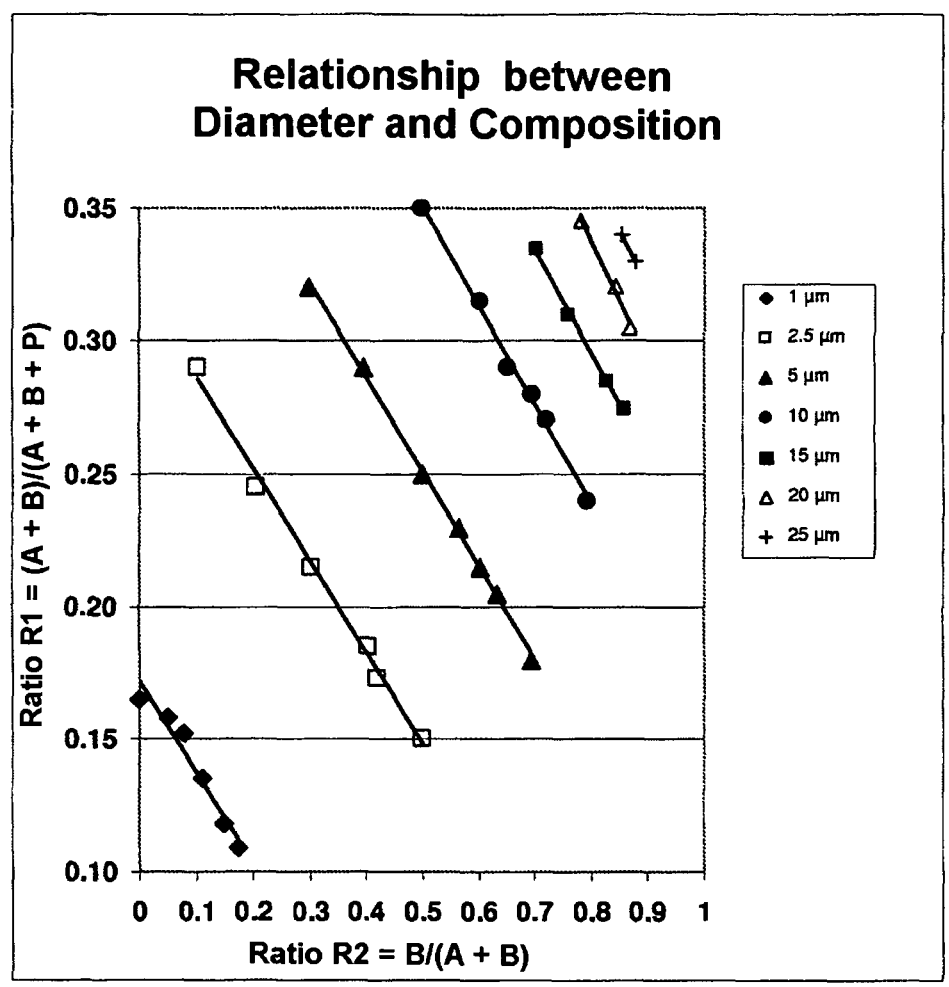

PREPARATION OF THERMOPLASTIC POLYMER PARTICLES HAVING CONTROLLED GEOMETRY AND POWDERS OBTAINED THEREFROM

CROSS-REFERENCE TO PRIORITY/PCT APPLICATIONS

This application claims priority under 35 U.S.C. §119 of FR 0603142, filed Apr. 10, 2006, and is a continuation/national phase of PCT/EP 2007/053251, filed Apr. 3, 2007 and designating the United States (published in the French language on Oct. 18, 2007, as WO 2007/115977 A1; the title and abstract were also published in English), each hereby expressly incorporated by reference in its entirety and each assigned to the assignee hereof.

The invention relates to a process for the preparation of a powder composed of particles based on a thermoplastic polymer. The process of the invention more particularly comprises stages of preparation of a blend comprising the thermoplastic polymer and two additives in the molten state, of cooling the blend and of recovering the powder by separation. It also relates to the powder capable of being obtained by the process of the invention.

Thermoplastic polymers in the powder form, in particular in the form of spherical particles with a diameter generally of less than 1 mm, preferably of less than 100 µm, are of advantage in numerous applications. This is because thermoplastic polymer powders, such as polyamide powders, are used in particular as additive in paints, for example in paints for coating the floors of sports halls, which have to have nonslip properties. Thermoplastic polymer powders are also introduced into cosmetic products, such as sun creams, for caring for the body or face, and make-up-removing products. They are also used in the field of inks and papers.

Various processes for producing thermoplastic polymer powders are known to a person skilled in the art.

Thermoplastic polymer powders can be obtained, for example, by milling or cryogenic milling of thermoplastic polymer granules with an initial mean diameter of the order of 3 mm. Nevertheless, these mechanical conversions by size reduction often result in particles of irregular shape and with a size rarely less than 100 µm. The size distribution of these particles is often broad and the latter may be difficult to employ on the industrial scale.

It is also known to prepare thermoplastic polymer powders by distillation of the polymer in a solvent, followed by precipitation. As solvents for polymers, such as polyamide, for example, are highly corrosive and volatile, security conditions are strict and this process cannot be employed on an industrial scale. Furthermore, it is difficult according to this process. to control the shape of the particles, which can be a nuisance in some applications.

Other processes exist, according to which the thermoplastic polymer powders are prepared in situ during the polymerization of the monomers of the polymer.

For example, it is known to obtain polymer powders, such as polyamide powders, by anionic polymerization of lactams in solution. The polymerization is carried out in the presence of the monomers, of a solvent for the monomers, of an initiator, of a catalyst and of an activator and the polymerization is carried out with stirring at a temperature in the region of 110° C. This process is specific to the polyamides obtained from monomers of lactam type. It is not very flexible and does not make it possible to vary the nature of the powders as a function of the final properties desired for the powder, for example by varying the nature of the monomers. It is also known to obtain copolyesteramide powders by anionic polymerization of lactams and lactones. These processes by the anionic polymerization route are difficult to control due to the high reactivity of the anionic route in particular.

The size required for the particles of the powder varies according to the field of application of the powders. For example, in the field of paint and varnishes, the size required for the particles varies from 0.1 to 10 µm; in the field of cosmetics, the powders have a particle size of between 5 and 10 µm; in the field of rotational molding, the size of the particles varies from 300 to 500 µm. Thus, the aim is to find powders having a predetermined and targeted particle size and also flexible processes for powder preparation which make it possible to vary the size of the particles of the powder.

One of the aims of the invention is to provide a process for the manufacture of a thermoplastic material powder comprising particles with a predetermined size, which may be small, and of substantially regular shape exhibiting the abovementioned advantages.

To this end, the invention provides a process of manufacture of a thermoplastic material powder comprising particles with a predetermined mean diameter of less than 1 mm, comprising the following stages:
a. forming a melt blend of said thermoplastic material P with at least one additive A in order to obtain a dispersion of discrete particles of the thermoplastic material P, said additive A being formed by a polymeric material having at least a portion of its structure compatible with said thermoplastic material P and at least a portion of its structure incompatible with and insoluble in said thermoplastic material P,
b. cooling said blend to a temperature below the softening temperature of the thermoplastic material P,
c. treating said cold blend in order to bring about the separation of the discrete particles of thermoplastic material P,
at least one compound B which is insoluble in and incompatible with the thermoplastic material P being introduced in stage a) in order to obtain particles with the desired mean diameter.

According to an advantageous characteristic of the invention, the formation of the blend is obtained by melting thermoplastic material and adding the additive A and the compound B in the solid or molten form and applying a blending energy in order to obtain the formation of the discrete particles of thermoplastic material dispersed in an advantageously continuous phase formed by the additive A and the compound B.

This blend can be obtained in another embodiment of the invention by blending particles of said thermoplastic material P and particles of said additive A and particles of said compound B in the solid state and melting the blend of particles with application to the melt blend of a blending energy in order to obtain the formation of discrete particles of thermoplastic material P dispersed in an advantageously continuous phase formed by the additive A and the compound B.

The additive A and the compound B can be added simultaneously or successively. When the additive A and the compound B are added successively, the additive A is preferably added before the compound B.

The ratios by weight $R_1$ and $R_2$ are defined as follows: $R_1$ is the (weight of additive A+weight of compound B)/(weight of additive A+weight of compound B+weight of material P) ratio by weight.

$R_2$ is the (weight of compound B)/(weight of additive A+weight of compound B) ratio by weight.

For a given material P/additive A/compound B system, there generally exists a linear relationship, for a chosen particle size, between $R_1$ and $R_2$. This linear relationship can vary according to the blending conditions for the P/additive A/compound B system.

Thus, the judicious choice of the ratio $R_1$ and of the ratio $R_2$ as defined above in the process of the invention makes it possible in particular to obtain powders formed of particles with a predetermined mean diameter. The process of the invention makes it possible to control the size of the particles in the powder. It makes it possible to obtain powders having a chosen and targeted particle size. The process is flexible, it being possible for the size of the particles of the powder to be chosen within a broad range of in particular between 0.1 and 800 μm.

Advantageously, the additive A, the compound B and the thermoplastic material P are introduced in stage a) according to an (additive A+compound B)/(additive A+compound B+material P) ratio by weight $R_1$ of between 0.01 and 0.6, preferably of between 0.01 and 0.5.

According to yet another characteristic of the invention, the concentration by weight of additive A in the blend is advantageously between 1% and 50%, preferably between 3% and 30%.

According to yet another characteristic of the invention, the concentration by weight of additive B in the blend is advantageously between 1% and 50%, preferably between 3% and 30%.

More generally, the blend can be obtained by any suitable device, such as worm or agitator mixers compatible with the temperature and pressure conditions used for the processing of the thermoplastic materials.

According to a preferred embodiment of the invention, the melt blend is shaped before the cooling stage, for example in the form of filaments or rods. This shaping can advantageously be carried out by a process of extrusion through a die.

According to a preferred embodiment of the invention, in particular when the melt blend is shaped, this melt blend is preferably produced in an extruder feeding the extrusion die.

The cooling of the melt blend can be carried out by any appropriate means. Among these, pneumatic cooling or dipping in a liquid are preferred.

The stage of recovery of the thermoplastic material powder advantageously consists of a treatment for separation of the discrete particles of thermoplastic material. This separation can be obtained by application of a shear force to the cooled blend.

The term "separation" is understood to mean the action which consists in dividing the discrete particles of thermoplastic material from the other components of the blend.

According to another embodiment of the invention, the separation of the particles made of thermoplastic material is obtained by dipping the cooled melt blend in a liquid which is not a solvent for the thermoplastic material and which is advantageously a solvent for the additive A and the compound B.

The process of the invention makes it possible to manufacture powders starting from any thermoplastic material.

Mention may be made, as example of thermoplastic polymer, of polyamides, polyesters, polyurethanes, polyolefins, such as polyethylene or propropylene, polystyrene, and the like.

According to a specific embodiment of the process of the invention, the preferred thermoplastic polymers are polyamides.

Any polyamide known to a person skilled in the art can be used in the context of the invention. The polyamide is generally a polyamide of the type of those obtained by polycondensation starting from dicarboxylic acids and diamines, or of the type of those obtained by polycondensation of lactams and/or amino acids. The polyamide of the invention can be a blend of polyamides of different types and/or of the same type, and/or copolymers obtained from different monomers corresponding to the same type and/or to different types of polyamide.

Mention may be made, as example of a polyamide which may be suitable for the invention, of polyamide 6, polyamide 6,6, polyamide 11, polyamide 12, polyamides 4,6, 6,10, 6,12, 12,12, and 6,36, semiaromatic polyamides, for example polyphthalamides obtained from terephthalic and/or isophthalic acid, such as the polyamide sold under the trade name Amodel, their copolymers and their alloys.

According to a preferred embodiment of the invention, the polyamide is chosen from polyamide 6, polyamide 6,6, their blends and their copolymers.

According to a specific embodiment of the invention, the thermoplastic polymer is a polymer comprising star macromolecular chains. The polymers comprising such star macromolecular chains are described, for example, in the documents FR 2 743 077, FR 2 779 730, U.S. Pat. No. 5,959,069, EP 0 632 703, EP 0 682 057 and EP 0 832 149. These compounds are known to exhibit an improved flowability in comparison with linear polyamides of the same molecular weight.

According to another specific embodiment of the invention, the thermoplastic polymer is a polycondensate composed of:

30 to 100 mol % (limits included) of macromolecular chains corresponding to the following formula (I):

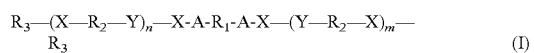

0 to 70 mol % (limits included) of macromolecular chains corresponding to the following formula (II):

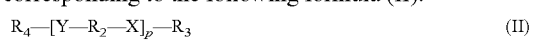

in which:
—X—Y— is a radical resulting from the polycondensation of two reactive functional groups $F_1$ and $F_2$, such that:
  $F_1$ is the precursor of the radical —X— and $F_2$ is the precursor of the radical —Y—, or vice versa,
  the functional groups $F_1$ cannot react with one another by condensation,
  the functional groups $F_2$ cannot react with one another by condensation,
A is a covalent bond or an aliphatic hydrocarbon radical which can comprise heteroatoms and which comprises from 1 to 20 carbon atoms,
$R_2$ is a branched or unbranched aliphatic or aromatic hydrocarbon radical comprising from 2 to 20 carbon atoms,
$R_3$ and $R_4$ represent hydrogen, a hydroxyl radical or a hydrocarbon radical,
$R_1$ is a linear or cyclic and aromatic or aliphatic hydrocarbon radical comprising at least 2 carbon atoms which can comprise heteroatoms,
n, m and p each represent a number between 50 and 500, preferably between 100 and 400.

Such a polycondensate is described in application WO 05/019510, incorporated by reference. Advantageously, the polycondensate is a polyamide composed of:

30 to 100 mol % (limits included) of macromolecular chains corresponding to the following formula (I):

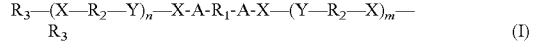

0 to 70 mol % (limits included) of macromolecular chains corresponding to the following formula (II):

in which:
Y is the

radical when X represents the

radical,
Y is the

radical when X represents the

radical,
A is a covalent bond or an aliphatic hydrocarbon radical which can comprise heteroatoms and which comprises from 1 to 20 carbon atoms,
$R_2$ is a branched or unbranched aliphatic or aromatic hydrocarbon radical comprising from 2 to 20 carbon atoms,
$R_3$ and $R_4$ represent hydrogen, a hydroxyl radical or a hydrocarbon radical comprising a

or

group,
$R_5$ represents hydrogen or a hydrocarbon radical comprising from 1 to 6 carbon atoms,
$R_1$ is a linear or branched and aromatic or aliphatic hydrocarbon radical comprising at least two carbon atoms which can comprise heteroatoms,
n, m and p each represent a number between 50 and 500, preferably between 100 and 400.

The thermoplastic polymers used in the invention can comprise various additives, such as matifying agents, heat stabilizers, light stabilizers, pigments, dyes and fillers, in particular abrasive fillers. Mention may in particular be made, by way of example, of titanium oxide, zinc oxide, cerium oxide, silica or zinc sulfide, which are used as matifying agent and/or abrasive.

The process of the invention can employ one or more additives A.

According to another characteristic of the invention, the additive A is advantageously a polymer of the block, sequence, comb, hyperbranched or star type. Thus, the, structure compatible with the thermoplastic material forms a block, a sequence, the backbone or the teeth of the comb, the core or the branches of the star or hyperbranched polymer.

According to a preferred embodiment of the invention, the compatible structure of the additive A comprises functional groups chemically identical to those of the thermoplastic polymer P.

According to the preferred embodiment of the invention, the additive A is chosen from the group consisting of a polymer D defined below or a hyperbranched polymer E comprising at least one polyalkylene oxide block.

Said polymer D is a polymer having thermoplastic properties comprising a block of thermoplastic polymer and at least one block of polyalkylene oxide, such that:
the block of thermoplastic polymer comprises a star or H macromolecular chain comprising at least one polyfunctional core and at least one branch or one segment of thermoplastic polymer connected to the core, the core comprising at least three identical reactive functional groups,
the block or blocks of polyalkylene oxide are connected to at least a portion of the free ends of the star or H macromolecular chain chosen from the thermoplastic polymer branch or segment ends and the ends of the polyfunctional core.

Such thermoplastic polymers and their process of preparation are described in particular in the document WO 03/002668.

The star macromolecular chain of the polymer D is advantageously a star polyamide obtained by copolymerization starting from a mixture of monomers comprising:
a) a polyfunctional compound comprising at least three identical reactive functional groups chosen from the amine functional group and the carboxylic acid functional group,
b) monomers of following general formulae (IIa) and/or (IIb):

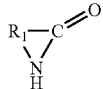

c) if appropriate, monomers of following general formula (III):

in which:
Z represents a functional group identical to that of the reactive functional groups of the polyfunctional compound,
$R_1$ and $R_2$ represent identical or different, substituted or unsubstituted and aliphatic, cycloaliphatic or aromatic hydrocarbon radicals comprising from 2 to 20 carbon atoms which can comprise heteroatoms, Y is a primary amine functional group when X represents a carboxylic acid functional group, or Y is a carboxylic acid functional group when X represents a primary amine functional group.

The H macromolecular chain of the block of thermoplastic polymer of the polymer D is advantageously an H polyamide obtained by copolymerization starting from a mixture of monomers comprising:

a) a polyfunctional compound comprising at least three identical reactive functional groups chosen from the amine functional group and the carboxylic acid functional group, b) lactams and/or amino acids, c) a difunctional compound chosen from dicarboxylic acids or diamines, d) a monofunctional compound, the functional group of which is either an amine functional group or a carboxylic acid functional group, the functional groups of c) and d) being amine when the functional groups of a) are acid, the functional groups of c) and d) being acid when the functional groups of a) are amine, the ratio as equivalents of the functional groups of a) to the sum of the functional groups of c) and d) being between 1.5 and 0.66, and the ratio as equivalents of the functional groups of c) to the functional groups of d) being between 0.17 and 1.5.

Advantageously, the polyfunctional compound of the star or H macromolecular chains is represented by the formula (IV):

$$R1-[-A-z]_m \quad (IV)$$

in which:

R1 is a linear or cyclic and aromatic or aliphatic hydrocarbon radical comprising at least two carbon atoms which can comprise heteroatoms, A is a covalent bond or an aliphatic hydrocarbon radical comprising from 1 to 6 carbon atoms, Z represents a primary amine radical or a carboxylic acid radical, m is an integer between 3 and 8.

Preferably, the polyfunctional compound is chosen from 2,2,6,6-tetra(β-carboxyethyl)cyclohexanone, trimesic acid, 2,4,6-tri(aminocaproic acid)-1,3,5-triazine or 4-aminoethyl-1,8-octanediamine.

The block of polyalkylene oxide (POA) of the polymer D is preferably linear. It can be chosen from polyethylene oxide, polytrimethylene oxide or polytetramethylene oxide blocks. In the case where the block is based on polyethylene oxide, it can comprise propylene glycol units at the ends of the block. The block of polyalkylene oxide of the polymer D is preferably a block of polyethylene oxide.

Advantageously, all the free ends of the macromolecular chain of the block of thermoplastic polymer of the polymer D are connected to a block of polyalkylene oxide.

The term "hyperbranched polymer E according to the invention" is understood to mean a branched polymeric structure obtained by polymerization in the presence of compounds having a functionality of greater than 2 and having a structure which is not fully controlled. Random copolymers are often involved. The hyperbranched polymers can, for example, be obtained by reaction between, in particular, polyfunctional monomers, for example trifunctional and bifunctional monomers, each of the monomers carrying at least two different polymerization reactive functional groups.

Advantageously, the hyperbranched polymer E of the invention is chosen from hyperbranched polyesters, polyesteramides and polyamides.

The hyperbranched polymer E of the invention is preferably a hyperbranched copolyamide of the type of those obtained by reaction between:

at least one monomer of following formula (I):

$$A-R-B_f \quad (I)$$

in which A is a polymerization reactive functional group of a first type, B is a polymerization reactive functional group of a second type which is capable of reacting with A, R is a hydrocarbon entity and f is the total number of B reactive functional groups per monomer: $f \geq 2$, preferably $2 \leq f \leq 10$;

at least one monomer of following formula (II):

$$A'-R'-B' \text{ or the corresponding lactams,} \quad (II)$$

in which A', B' and R' have the same definition as that given above for A, B and R respectively in the formula (I);

at least one "core" monomer of following formula (III) or at least one "chain-limiting" monomer of following formula (IV):

$$R^1(B'')_n \quad (III)$$

in which:

$R^1$ is a substituted or unsubstituted hydrocarbon radical of the silicone, linear or branched alkyl, aromatic, alkylaryl, arylalkyl or cycloaliphatic type which can comprise unsaturations and/or heteroatoms;

B" is a reactive functional group of the same nature as B or B';

$n \geq 1$, preferably $1 \leq n \leq 100$;

$$R^2-A'' \quad (IV)$$

in which:

$R^2$ is a substituted or unsubstituted hydrocarbon radical of the silicone, linear or branched alkyl, aromatic, arylalkyl, alkylaryl or cycloaliphatic type which can comprise one or more unsaturations and/or one or more heteroatoms;

and A" is a reactive functional group of the same nature as A or A';

the molar ratio I/II being defined as follows:
and preferably $$0.05 < I/II$$

and preferably $$0.125 \leq I/II \leq 2;$$

at least one of the entities R or R' of at least one of the monomers (I) or (II) being aliphatic, cycloaliphatic or arylaliphatic;

$R_1$ and/or $R_2$ being polyoxyalkylene radicals.

Such copolyamides are described in the document WO 00/68298 A1, in particular on page 11, lines 3 to 6.

The polymerization reactive functional groups A, B, A' and B' are advantageously chosen from the group consisting of carboxyl and amine functional groups.

The monomer of formula (I) of the hyperbranched copolyamide is advantageously a compound in which A represents the amine functional group, B represents the carboxyl functional group, R represents an aromatic radical and f=2.

$R_1$ and/or $R_2$ are advantageously amine-comprising polyoxyalkylene radicals of Jeffamine® type.

The compound B of the process of the invention is insoluble in and incompatible with the thermoplastic material P. Advantageously, this compound B has a chemical structure compatible with at least a portion of the structure of the additive A, in particular the portion of the structure of A incompatible with the compound P. Preferably, the compound B is a homopolymer of the incompatible portion of the additive A. Mention may be made, as example of compounds B suitable for the invention, of compounds belonging to the families of the polysaccharides, polyoxyalkylene glycols, polyolefins, silicones, waxes, and the like. The compound B can be added separately from the additive A or in the form of a blend with at least a portion of the additive A. The process of the invention can employ one or more compounds B.

It can also be preblended with the material P.

Any method known to a person skilled in the art for preparing a blend can be used to prepare the blend according to the invention. It is possible, for example, to produce an intimate blend of the granules of thermoplastic polymer P, of additive A and of compound B, or a blend of the granules of thermoplastic polymer P, of the granules of the additive A and of the granules of the compound B. The thermoplastic polymer P can also be provided in the form of granules which are coated with the additive A and/or the compound B. The additive A and the compound B can be introduced into the polymer P during the polymerization process, advantageously at the end of polymerization. It is also possible to introduce the additive A and the compound B into the molten polymer.

Stage a) consists in preparing the melt blend, with stirring.

This stage is advantageously carried out in any mixing device compatible with the pressure and temperature conditions for processing the thermoplastic materials. Stage a) is preferably carried out in an extruder, more preferably still in a twin-screw or multiscrew extruder.

The blend can be prepared according to a form described above and then introduced into the extrusion device employed during stage a). The blend can be introduced in the solid or liquid form, for example in the molten state.

The blend can also be prepared in situ in the same extrusion device as that employed during stage a).

The stirring during stage a) makes possible shearing of the composition and effective blending of the thermoplastic material, of the additive A and of the compound B. The shear energy applied is determined as a function of the nature of the products to be blended and of the size desired for the particles of thermoplastic material.

The blend, before being cooled according to stage b), can be extruded through a die in order to be put into the form of a rod, strand or film in a conventional way known to a person skilled in the art.

Stage b) consists in cooling the blend in order to solidify at least the thermoplastic polymer. This cooling can be carried out conventionally using air or water.

The stage of separating the particles of thermoplastic polymer from the cooled blend can be carried out according to different processes.

Thus, a first process consists of the application of a mechanical force, such as rubbing, shearing or twisting, necessary to bring about this separation.

In another embodiment, separation occurs instantaneously when the cooled blend is introduced into a liquid, such as water, for example.

In yet another embodiment, the liquid is advantageously a solvent for the additive A and the compound B. Thus, it is possible to recover a large part of the additive A and the compound B in order to be able, for example, to reuse them. Furthermore, the thermoplastic polymer powder will comprise a lower amount of impurities, of additive A and of compound B.

In other cases, it may be advantageous not to remove the additive A, which will remain present at the surface of the particles of thermoplastic material, thus modifying the surface properties of these particles.

Advantageously, stages b) and c) are carried out simultaneously. For example, the blend, after extrusion through a die, can be introduced directly into a reactor comprising a solvent for the additive A and the compound B and a nonsolvent for the polymer P.

The particles of polymer P are optionally isolated from the solvent/additive A/compound B solution. This can be carried out by any means which makes it possible to separate a liquid phase and a suspended solid phase. The procedure can consist, for example, of a filtration, separation by settling, centrifuging or spraying.

If, for example, an aqueous dispersion is concerned, the product can be isolated, for example, by spraying in order to recover a powder comprising individual particles with a size equivalent to those present in the dispersion and/or aggregates of particles. These aggregates are generally easily redispersible in an aqueous medium, such as water, or broken up by the application of vibrations to the powder. Other means for removing the water or recovering the powder can be used, such as filtration or centrifuging, followed by drying the filtration cake.

The particles of polymer P thus obtained can be washed and dried.

The process of the invention makes it possible to obtain particles of controlled geometry, in particular by adjusting the stirring during stage a), the nature of the compounds A and/or B, the temperature and the concentration of the various components of the blend.

One of the subject matters of the invention is the thermoplastic material powders capable of being obtained by the process of the invention.

Advantageously, the particles obtained according to the process of the invention are spherical particles.

The term "spherical particle" is understood to mean a particle of essentially spherical shape.

Advantageously, the mean particle diameter desired according to the process of the invention is advantageously between 0.1 and 800 µm. The desired diameter varies according to the fields of use of the powders. The size of the particles of the powders of the invention is controlled and the distribution of the size of the particles is generally unimodal.

The term "mean diameter" is understood to mean the value of the modal peak of the unimodal distribution of the size of the particles.

The size distribution of the particles is generally determined by laser particle sizing according to a method known to a person skilled in the art.

The particles can also be of regular or irregular polyhedral shape. These particles constituting the thermoplastic material powder generally have a pore volume equal to or in the vicinity of 0 cm$^3$/g as the particles generally do not exhibit any porosity.

Other details or advantages of the invention will become more clearly apparent in the light of the examples given below and with reference to the appended figure, which represents a graph of the dispersion obtained.

EXAMPLES

The materials used in the examples are as follows:
Polymer P: polyamide 66 with a relative viscosity of 2.6
Additive A: hydrophilic star polyamide/polyalkylene oxide copolymer produced in the following way:
1116.0 g of ε-caprolactam (9.86 mol), 57.6 g of 1,3,5-benzenetricarboxylic acid (0.27 mol), 1826.4 g of Jeffamine® M2070 (0.82 mol), 1.9 g of Ultranox® 236 and 3.5 g of 50% (w/w) aqueous hypophosphorous acid solution are introduced into a 7.5 liter autoclave equipped with a mechanical stirrer.

The reaction mixture is brought to 250° C. under nitrogen and at atmospheric pressure and maintained at this temperature for 1 h. The system is then gradually placed under vacuum for 30 min up to a pressure of 5 mbar and then maintained under vacuum for an additional hour. The system is subsequently run onto a plate.

Compound B:
Compound B1: Polyethylene oxide with a molecular weight of 400 g/mol,
Compound B2: Polyethylene oxide with a molecular weight of 1500 g/mol,
Compound B3: Polyethylene oxide with a molecular weight of 12 000 g/mol.

The following are introduced into a 24D twin-screw extruder of Prism type: granules of polymer P using feeding by volume and a blend of pellets of the additive A and of compound B (B1, B2 or B3) using feeding by weight. The throughputs of the two metering devices are adjusted so as to be able to vary the concentration of additive A and of compound B in the blend with the thermoplastic polymer P. The blends are extruded at a fixed throughput between 1.9 and 2.2 kg/hour. The temperatures of the various zones of the extruder are between 275 and 295° C. The speed is set at 200 rpm. The pressure recorded is between 10 and 13 bar. The rods obtained are quenched at the die outlet with a stream of water, collected in a metal basket, drained and then dried.

The rods collected are subsequently dispersed in water by simple mechanical stirring. The dispersion thus obtained is sieved with a 200 μm sieve to remove the large solid impurities, such as nondispersible pieces of rod. The yields by weight for recovery of thermoplastic polymer P after sieving are greater than 90%. The particle size distribution of the particles present in the dispersion is measured using a MasterSizer 2000 device sold by Malvern Instruments. This distribution, expressed by volume, obtained after application of ultrasound, is unimodal and the value reported in the tables below corresponds to the value of the modal peak.

Various powders were obtained and characterized according to the procedure described above.

Examples 1 to 15

In these examples, different concentrations of additive A are employed and, for each concentration of additive A, the concentration of compound B is varied in order to obtain different sizes of powder particles (see table 1 below).

The percentages below are expressed by weight with respect to the weight of the composition.

TABLE 1

| Example No. | Polymer P (%) | Additive A (%) | Compound B2 (%) | $R_1$ | $R_2$ | Size (μm) |
|---|---|---|---|---|---|---|
| 1 | 76.0 | 5.0 | 19.0 | 0.240 | 0.792 | 10.0 μm |
| 2 | 71.5 | 5.0 | 23.5 | 0.285 | 0.825 | 15.0 μm |
| 3 | 68.0 | 5.0 | 27.0 | 0.320 | 0.844 | 20.0 μm |
| 4 | 66.0 | 5.0 | 29.0 | 0.340 | 0.853 | 25.0 μm |
| 5 | 85.0 | 7.5 | 7.5 | 0.150 | 0.500 | 2.5 μm |
| 6 | 79.5 | 7.5 | 13.0 | 0.205 | 0.634 | 5.0 μm |
| 7 | 73.0 | 7.5 | 19.5 | 0.270 | 0.722 | 10.0 μm |
| 8 | 69.0 | 7.5 | 23.5 | 0.310 | 0.758 | 15.0 μm |
| 9 | 65.5 | 7.5 | 27.0 | 0.345 | 0.783 | 20.0 μm |
| 10 | 63.5 | 7.5 | 29.0 | 0.365 | 0.795 | 25.0 μm |
| 11 | 88.25 | 10.0 | 1.75 | 0.118 | 0.149 | 1.0 μm |
| 12 | 82.75 | 10.0 | 7.25 | 0.173 | 0.420 | 2.5 μm |

TABLE 1-continued

| Example No. | Polymer P (%) | Additive A (%) | Compound B2 (%) | $R_1$ | $R_2$ | Size (μm) |
|---|---|---|---|---|---|---|
| 13 | 77.0 | 10.0 | 13.0 | 0.230 | 0.565 | 5.0 μm |
| 14 | 71.0 | 10.0 | 19.0 | 0.290 | 0.655 | 10.0 μm |
| 15 | 66.5 | 10.0 | 23.5 | 0.335 | 0.701 | 15.0 μm |

Examples 16 to 35

In these examples, powders having variable particle sizes are produced and, for each particle size, the concentrations of additive A and of compound B in the composition are varied (see table 2 below).

The percentages below are expressed by weight with respect to the weight of the composition.

TABLE 2

| Example No. | Polymer P (%) | Additive A (%) | Compound B2 (%) | $R_1$ | $R_2$ | Size (μm) |
|---|---|---|---|---|---|---|
| 16 (comparative) | 83.5 | 16.5 | 0.0 | 0.165 | 0.000 | 1.0 μm |
| 17 | 84.2 | 15.0 | 0.8 | 0.158 | 0.051 | 1.0 μm |
| 18 | 84.8 | 14.0 | 1.2 | 0.152 | 0.079 | 1.0 μm |
| 19 | 86.5 | 12.0 | 1.5 | 0.135 | 0.111 | 1.0 μm |
| 20 | 89.1 | 9.0 | 1.9 | 0.109 | 0.174 | 1.0 μm |
| 21 | 71.0 | 26.0 | 3.0 | 0.290 | 0.103 | 2.5 μm |
| 22 | 69.0 | 19.5 | 5.0 | 0.245 | 0.204 | 2.5 μm |
| 23 | 78.5 | 15.0 | 6.5 | 0.215 | 0.302 | 2.5 μm |
| 24 | 81.5 | 11.0 | 7.5 | 0.185 | 0.405 | 2.5 μm |
| 25 | 68.0 | 22.5 | 9.5 | 0.320 | 0.297 | 5.0 μm |
| 26 | 71.0 | 17.5 | 11.5 | 0.290 | 0.397 | 5.0 μm |
| 27 | 75.0 | 12.5 | 12.5 | 0.250 | 0.500 | 5.0 μm |
| 28 | 78.5 | 8.5 | 13.0 | 0.215 | 0.605 | 5.0 μm |
| 29 | 82.0 | 5.5 | 12.5 | 0.180 | 0.694 | 5.0 μm |
| 30 | 65.0 | 17.5 | 17.5 | 0.350 | 0.500 | 10.0 μm |
| 31 | 68.5 | 12.5 | 19.0 | 0.315 | 0.603 | 10.0 μm |
| 32 | 72.0 | 8.5 | 19.5 | 0.280 | 0.696 | 10.0 μm |
| 33 | 72.5 | 4.0 | 23.5 | 0.275 | 0.855 | 15.0 μm |
| 34 | 69.5 | 4.0 | 26.5 | 0.305 | 0.869 | 20.0 μm |
| 35 | 67.0 | 4.0 | 29.0 | 0.330 | 0.879 | 25.0 μm |

FIG. 1, which corresponds to examples 1 to 35, illustrates the linear relationship between the ratios by weight $R_1$ and $R_2$ for a given particle size.

Examples 36 to 44

In these examples, powders are produced with the compounds B1 and B3 (see table 3 below).

The percentages below are expressed by weight with respect to the weight of the composition.

TABLE 3

| Example No. | Polymer P (%) | Additive A (%) | Nature of Compound B | Compound B (%) | Size (μm) |
|---|---|---|---|---|---|
| 36 (comparative) | 75.0 | 0.0 | B1 | 25.0 | Non-dispersible rod |
| 37 | 87.0 | 11.0 | B1 | 2.0 | 0.95 μm |
| 38 | 80.0 | 17.5 | B1 | 2.5 | 1.5 μm |
| 39 | 80.0 | 12.5 | B1 | 7.5 | 3.3 μm |
| 40 (comparative) | 89.0 | 0 | B3 | 11.0 | Non-dispersible rod |
| 41 | 88.5 | 9.2 | B3 | 2.3 | 1.1 μm |

TABLE 3-continued

| Example No. | Polymer P (%) | Additive A (%) | Nature of Compound B | Compound B (%) | Size (μm) |
|---|---|---|---|---|---|
| 42 (comparative) | 79.0 | 0.0 | B3 | 21.0 | Non-dispersible rod |
| 43 | 80.0 | 8.0 | B3 | 12.0 | 1.7 μm |
| 44 | 80.0 | 16.0 | B3 | 4.0 | 1.4 μm |

What is claimed is:

1. A process for the preparation of a thermoplastic material P powder comprising particles having controlled geometry and a predetermined mean diameter of less than 1 mm, which comprises the following stages:
   a. forming a melt blend of said thermoplastic material P with at least one additive A to obtain a dispersion of discrete particles of the thermoplastic material P, said additive A comprising a polymeric material having at least a portion of its structure compatible with said thermoplastic material P and at least a portion of its structure incompatible with and insoluble in said thermoplastic material P, to obtain a dispersion of discrete particles of said thermoplastic material P;
   b. cooling said blend to a temperature below the softening temperature of the thermoplastic material P;
   c. treating said cold blend and separating the discrete particles of thermoplastic material P; and
   d. introducing at least one compound B which is insoluble in and incompatible with the thermoplastic material P during said stage a) to provide said particles having the desired mean diameter,
   wherein the (weight of additive A +weight of compound B)/(weight of additive A +weight of compound B +weight of material P) ratio by weight $R_1$ ranges from 0.01 to 0.6,
   wherein the concentration by weight of additive A in the blend ranges from 1% to 50%, and
   wherein the additive A comprises a block copolymer D comprising a block of thermoplastic polymer and at least one block of polyalkylene oxide, with the provisos that:
   the block of thermoplastic polymer comprises a star or H macromolecular chain comprising at least one polyfunctional core and at least one branch or one segment of thermoplastic polymer bonded to the core, the core comprising at least three identical reactive functional groups, and
   the block or blocks of polyalkylene oxide are bonded to at least a portion of the free ends of the star or H macromolecular chain selected from the thermoplastic polymer branch or segment ends and the ends of the polyfunctional core.

2. The process as defined by claim 1, comprising forming the blend by melting thermoplastic material P and adding the additive A and the compound B in the solid or molten form and applying blending energy to provide the discrete particles of thermoplastic material P.

3. The process as defined by claim 1, comprising forming the blend by blending particles of said thermoplastic material P and particles of said additive A and particles of said compound B in the solid state and melting the blend of particles and applying blending energy to the melt blend to provide the discrete particles of thermoplastic material P.

4. The process as defined by claim 1, wherein the concentration by weight of compound B in the blend ranges from 1% to 50%.

5. The process as defined by claim 1, wherein the melt blend is shaped prior to the cooling stage.

6. The process as defined by claim 1, wherein a shaping process is performed via extrusion through a die.

7. The process as defined by claim 1, wherein the melt blend is produced in an extruder feeding an extrusion die.

8. The process as defined by claim 1, wherein the cooling comprises a pneumatic cooling.

9. The process as defined by claim 1, wherein the cooling is via dipping in a liquid.

10. The process as defined by claim 1, wherein the separation of the particles of thermoplastic material P is provided by application of a shear force to the cooled blend.

11. The process as defined by claim 1, wherein the separation of the particles of thermoplastic material P is provided by dipping the cooled melt blend in a liquid which is not a solvent for the thermoplastic material P.

12. The process as defined by claim 11, wherein the liquid is a solvent for the additive A and the compound B.

13. The process as defined by claim 1, wherein the thermoplastic material P comprises a polyamide or a polyester.

14. The process as defined by claim 13, wherein the thermoplastic polymer comprises a polyamide selected from the group consisting of polyamide 6, polyamide 6,6, polyamide 11, polyamide 12, polyamides 4,6, 6,10, 6,12, 12,12 and 6,36, and the copolymers and alloys thereof.

15. The process as defined by claim 1, wherein the thermoplastic material P comprises additives selected from the group consisting of matifying agents, heat and/or light stabilizers, pigments, dyes and fillers.

16. The process as defined by claim 1, wherein the compatible structure of the additive A comprises functional groups identical to those comprising the thermoplastic material P.

17. The process as defined by claim 1, wherein the block of thermoplastic polymer of the polymer D comprises the star macromolecular chain, which comprises a star polyamide obtained by copolymerization of a mixture of monomers comprising:
   a) a polyfunctional compound which comprises at least three identical reactive functional groups selected from an amine functional group and a carboxylic acid functional group,
   b) monomers of the following general formulae (IIa) and/or (IIb):

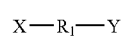
(IIa)

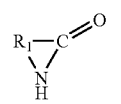
(IIb)

and c) optionally, monomers of the following general formula (III):

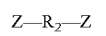
(III)

in which:
Z is a functional group identical to that of the reactive functional groups of the polyfunctional compound,
$R_1$ and $R_2$, which may be identical or different, are each a substituted or unsubstituted, aliphatic, cycloaliphatic, or aromatic hydrocarbon radical having from 2 to 20 carbon atoms and which can contain heteroatoms, and Y is either a primary amine functional group when X is a carboxylic acid functional group or is a carboxylic acid functional group when X is a primary amine functional group.

18. The process as defined by claim 17, wherein the polyfunctional compound has the following formula (IV):

$$R1\text{-}[\text{-}A\text{-}z]_m \qquad (IV)$$

in which:

R1 is a linear or cyclic, aliphatic or aromatic hydrocarbon radical having at least two carbon atoms and which can contain heteroatoms, A is a covalent bond or an aliphatic hydrocarbon radical having from 1 to 6 carbon atoms, Z is a primary amine radical or a carboxylic acid radical, and m is an integer ranging from 3 to 8.

19. The process as defined by claim 17, wherein the polyfunctional compound is selected from among 2,2,6,6-tetra(β-carboxyethyl)cyclohexanone, trimesic acid, 2,4,6-tri(aminocaproic acid)-1,3,5-triazine and 4-aminoethyl-1,8-octanediamine.

20. The process as defined by claim 17, wherein the block of polyalkylene oxide of the polymer D is linear.

21. The process as defined by claim 20, wherein the block of polyalkylene oxide of the polymer D is a block of polyethylene oxide.

22. The process as defined by claim 1, wherein the block of thermoplastic polymer of the polymer D comprises the H macromolecular chain, which comprises an H polyamide obtained by copolymerization of a mixture of monomers comprising:

a) a polyfunctional compound which comprises at least three identical reactive functional groups selected from an amine functional group and a carboxylic acid functional group, b) lactams and/or amino acids, c) a difunctional compound selected from among dicarboxylic acids or diamines, and d) a monofunctional compound, the functional group of which is either an amine functional group or a carboxylic acid functional group, wherein the functional groups of c) and d) are an amine when the functional groups of a) are an acid, wherein the functional groups of c) and d) are an acid when the functional groups of a) are an amine, wherein the ratio as equivalents of the functional groups of a) to the sum of the functional groups of c) and d) ranges from 1.5 and 0.66, and wherein the ratio as equivalents of the functional groups of c) to the functional groups of d) ranges 0.17 to 1.5.

23. The process as defined by claim 1, wherein the free ends of the macromolecular chain of the block of thermoplastic polymer of the polymer D are bonded to a block of polyalkylene oxide.

24. The process as defined by claim 1, wherein the compound B has a structure compatible with at least a portion of the structure of the additive A.

25. The process as defined by claim 24, wherein the compound B is selected from among the polysaccharides, polyoxyalkylene glycols, polyolefins and silicones.

26. The process as defined by claim 1, wherein the desired mean diameter of the particles ranges from 0.1 to 800 μm.

* * * * *